United States Patent

Fuentes

[11] Patent Number: 5,960,340
[45] Date of Patent: Sep. 28, 1999

[54] AUTOMATIC CELLULAR TELEPHONE REGISTRATION FOR UNIVERSAL TELEPHONE NUMBER SERVICE

[75] Inventor: James Joseph Fuentes, South Barrington, Ill.

[73] Assignee: AT&T Corporation, Middletown, N.J.

[21] Appl. No.: 08/608,232

[22] Filed: Feb. 28, 1996

[51] Int. Cl.⁶ .............................. H04M 3/42; H04Q 7/20
[52] U.S. Cl. .................. 455/417; 455/461; 455/445; 455/414
[58] Field of Search ................................. 455/435, 445, 455/461, 432, 422, 418, 419, 436, 417, 414; 379/FOR 106, FOR 103

[56] References Cited

U.S. PATENT DOCUMENTS

| | | | |
|---|---|---|---|
| 4,748,655 | 5/1988 | Thrower et al. | 455/435 |
| 4,752,951 | 6/1988 | Konneker | 455/435 |
| 4,833,701 | 5/1989 | Comroe et al. | 455/432 |
| 4,901,340 | 2/1990 | Parker et al. | 455/432 |
| 5,197,092 | 3/1993 | Bamburak | 455/435 |
| 5,243,645 | 9/1993 | Bissell et al. | 455/435 |
| 5,315,637 | 5/1994 | Breeden et al. | 455/445 |
| 5,329,578 | 7/1994 | Brennan et al. | 455/445 |
| 5,428,663 | 6/1995 | Grimes et al. | 455/417 |
| 5,440,613 | 8/1995 | Fuentes . | |
| 5,440,614 | 8/1995 | Sonberg et al. | 455/414 |
| 5,509,062 | 4/1996 | Carlsen | 455/461 |
| 5,657,375 | 8/1997 | Connolly et al. | 455/436 |

FOREIGN PATENT DOCUMENTS

| | | | |
|---|---|---|---|
| 38 63 870 | 6/1990 | Germany | 379/FOR 106 |
| 6-276569 | 3/1994 | Japan | 379/FOR 106 |
| 6-197387 | 7/1994 | Japan | 379/FOR 106 |

*Primary Examiner*—Dwayne D. Bost
*Assistant Examiner*—Tracy M. Legree
*Attorney, Agent, or Firm*—Banner & Witcoff, Ltd.

[57] ABSTRACT

A wireless system is equipped for autonomous registration of a wireless telephone when it receives the "on" registration message from the cell site (which contains the telephone number and equipment identification number of the mobile unit), sends such identification of the mobile unit over a data link into a signaling network of the public switch telephone network. The signaling network forwards this data message to a service control point which controls such universal telephone number systems to register the number of the wireless unit for use the next time the universal telephone number is called. Advantageously, the equipment identification number (EIN) also received with the telephone number of the mobile unit may be used as a PIN or general identification number of the subscriber.

14 Claims, 4 Drawing Sheets

AUTOMATIC CELLULAR TELEPHONE REGISTRATION FOR UNIVERSAL TELEPHONE NUMBER SERVICE

TECHNICAL FIELD

This invention relates to the field of universal telephone number services wherein a call to a single telephone number will be routed to the subscriber regardless of his or her location, and, more specifically, to an automatic registration system for such service when the subscriber uses his or her cellular telephone.

BACKGROUND OF THE INVENTION

Being "in touch" has become increasingly important for some people, i.e., doctors, business executives, attorneys, sales people, etc., who have a strong need to be reached wherever they are. Many of these people have a telephone for business, for home, a cellular telephone for the car, and/or a transportable cellular telephone that can be carried around when that person is not near one of the other telephones. Additionally, many of these professionals travel frequently but still need to be reached.

For these people, the telephone industry introduced several programs which permit these individuals to keep in touch. For example, AT&T has a "Follow Me" service wherein, when the person subscribing to the service has one telephone number (i.e., 700-555-1234), and regardless of where the person is, he or she may be reached at that telephone number.

However, such services require that the subscriber call in to the service every time he or she changes location in order to register the telephone number at which the subscriber may be reached. Such registration usually requires the subscriber to dial a predefined number, enter a PIN or some form of identification, and then enter the telephone number of the telephone where he or she can be reached. Therefore, when the subscriber leaves his or her office and turns on a mobile telephone unit, the subscriber has to call in and register the telephone number of the mobile unit. When the person arrives at a destination, he or she has to register a new telephone number. Such constant registration of telephone numbers can be annoying to the subscriber, especially when he or she only uses the mobile unit for short periods of time (i.e., local trips). Thus, some people who could benefit from a universal telephone number do not subscribe or underutilize such a service, because it can be cumbersome to register the current reach number when the user changes from land-based to mobile frequency.

SUMMARY OF THE INVENTION

This problem is solved and a technical advance is achieved in the art by a system and method which automatically registers a mobile telephone number with a universal telephone number service whenever the mobile telephone is turned on. Advantageously, the cellular system comprises a mid-sized private branch exchange (PBX) as a mobile telecommunication switching office in an architecture which allows the PBX to communicate with cell sites of the cellular system as if the cell sites were other PBXs communicating via a system using out of band signaling, referred to herein as out of band service control (OBSC) such as that used in integrated services digital network (ISDN) communication links, wherein the out of band signaling communicates with a protocol converter to convert between ISDN and cell site protocols. In accordance with this invention, the system (advantageously at the protocol converter) is equipped for autonomous registration to receive data communications in the data link part of the ISDN connection; the protocol converter converts signals from the PBX from ISDN protocol to a protocol accepted by the cell site and then converts cell site data messages in a protocol normally destined for a mobile switch protocol to an ISDN protocol. In such an arrangement, the protocol converter may independently, when it receives the "on" registration message from the cell site (which contains the telephone number and electronic serial number of the mobile unit), sends such identification of the mobile unit over a data link into a signaling network of the public switch telephone network along with one of a preselected number of private or "guest" telephone numbers. The signaling network forwards this data message to a service control point which controls such universal telephone number systems to register the "guest" number for use the next time the universal telephone number is called. Advantageously, the telephone number of the wireless unit is identical to the universal telephone number. Further, the equipment identification number (EIN) also received with the telephone number of the mobile unit may be used as a PIN or general identification number of the subscriber. When a call is made to the universal number, the call is routed using the guest number to the PBX, translated to the wireless number, and the call is delivered to the wireless telephone in the normal fashion.

When the mobile unit is turned off, the off message is received by the protocol converter which then sends a message through the signaling network to the universal number service center to change the number. The number could default back to a home telephone, a work telephone, or a voice mail system. Alternatively, the user could enter a code (such as * or #6) which causes the universal telephone system to search a database and set the reach number to the database entry corresponding to the code. Through this method, the user does not have to re-register with the universal service every time he or she changes phones from the primary phone to his or her mobile phone.

DETAILED DESCRIPTION

Figure 1:
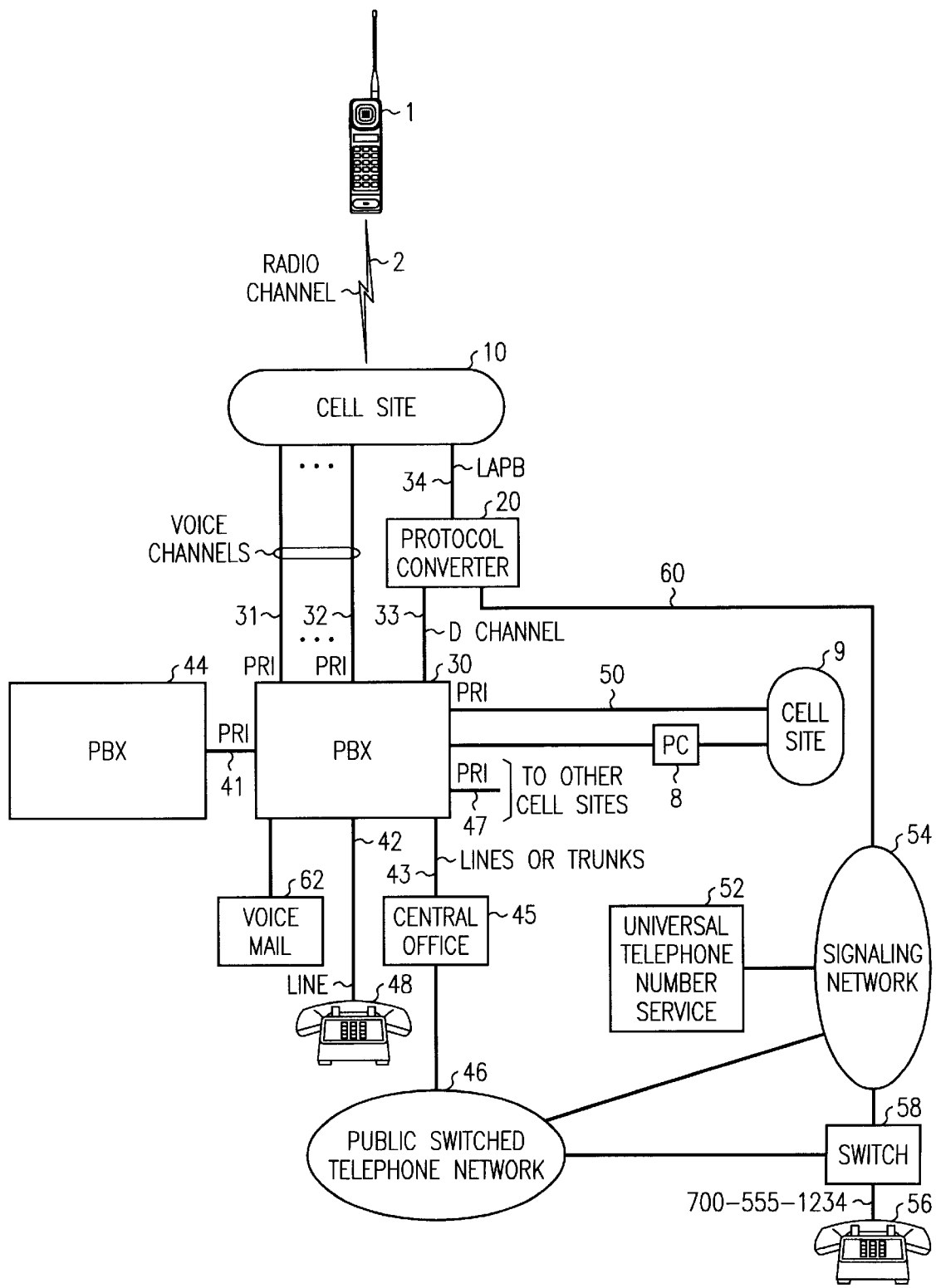
FIG. 1 is a block diagram illustrating the operation of the invention.

FIG. 1 is a block diagram illustrating the operation of applicant's invention in the context of a PCS mobile communications system. In this system cell site 10 communicates via radio channel 2 with a mobile station 1. A cell site such as the Autoplex® Series II Cell Site can be used in this application. A different cell site can be used if the European Global Systems for Mobile Communications (GSM) standard protocol is required. The cell site is connected by multiple DS1s (the number of DS1s being dependent on the number of radio channels) as one or more primary rate interface integrated services digital network (PRI-ISDN) communication channels 31, 32, 33 to a private branch exchange (PBX) 30. DS1s 31 and 32 comprise non-facilities associates signaling (NFAS) PRIs as known in the art, and thus carry no signaling or "D" channel. DS1 33 includes a signaling or "D" channel which carries control data for PRIs 31 and 32, as well as 33. Protocol converter 20, also connected to a DS1, strips the D-channel from the PRI signals and converts these D-channel signals to cell control messages. An NCR 3333 (Intel 486 based) computer manufactured by NCR, Inc., can be used as the protocol converter (PC); the NCR computer is equipped with an interface board such as a Primary Rate Inc. Controller Board for UNIX® systems to terminate the two data links to the PC. Cell site 10 receives its control signals over the data link 34 resident on the DS1 and transmits its responses and its own initiated data messages over that link. The protocol converter converts between ISDN control messages sent on D channel 33 specified in the CCITT Q.931 call control message set and the message set required to interface with a cell site. This message set may be proprietary or it may conform with a standard such as that specified in the European GSM standard for wireless communications.

PBX 30 is also connected by lines such as line 42 to land based telephone stations such as station 48; by one or more PRI facilities 41 to one or more other PBXs 44, the latter being for connection to the other cell sites; to one or more PRI facilities 47, 50 and 8 to one or more other cell sites; and by facilities such as lines or trunks 43 to a class 5 central office switch 45, the latter being for connection to a public switched telephone network for accessing of telephones and mobile stations outside the immediate region covered by PBXs 30 and 44 and central office 45. The connection to the class 5 central office can be over line facilities, one or more PRI facilities, or even T-1 carrier trunk facilities; a line interface is the most natural for communicating between a PBX and a central office, especially an older central office, and simplifies the process of billing at the central office.

The PBX keeps track of the busy-idle state of all mobile stations currently associated with a cell site. When a disconnect is received, the B-channel is made available through a release message from the PC; this makes the B-channel, and its associated radio channel, available and changes the busy-idle state of the mobile station to idle. The above system is further described in U.S. Pat. No. 5,440,613 to J. J. Fuentes and assigned to the assignee of the current invention and incorporated herein by reference.

Additionally, according to the prior art, there is a universal telephone number service 52 in telephone network associated with signaling network 54. Further, public switched telephone network 46 uses signaling network 54, as is known in the art, in order to pass signaling messages to and from universal telephone number service 52, in order to obtain routing information for calls placed to a universal telephone number.

An example of the use of an exemplary embodiment of this invention with a universal telephone number service follows. A user at telephone 56 dials a universal telephone number for the user of telephone 48. The number may be, for example, (700) 555-1234. Switch 58 recognizes (from the NPA or "700") that the call receives special call handling treatment and sends a message into the PSTN 46 directly to signaling network 54, requesting routing information for this particular call. Signaling network 54 recognizing the 700 service as being a universal telephone number sends a message to the network node, which supports the universal telephone number service, which, in this instance, is 52. 52 performs a database lookup, as is known in the art, to determine where to route the call (i.e., the destination telephone number). In this example, the telephone number found by universal telephone number service 52 is the telephone number of telephone 48. This information is sent back to switch 58, which routes the call to PSTN 46 through central office 45 (PBX 30), and to telephone 48 via line 42.

In the prior art, if the user of telephone 48 were to leave the location of telephone 48 and use his or her mobile unit 1, he/she would have to call through the cellular system central office and the public switch telephone network into the universal telephone number service 52, and register the number of mobile unit 1 by dialing a special personal identification number (PIN) and the telephone number of the mobile telephone 1.

According to this invention, the user no longer has to go through all the registration procedures when using his or her own mobile telephone. According to this invention, during the autonomous registration of the mobile unit, which occurs automatically at power on of the mobile unit (as described in the above-referenced patent), protocol converter 20 sends a message over a new data link 60 to signaling network 54, sending a registration message to universal telephone service 52, which includes the telephone number of mobile telephone 1 (which, advantageously, is the same number as the universal number, i.e., 700-555-1234). Protocol converter 20, 8 and the other protocol converters connected to PBX 30, in conjunction with PBX 30, select one of a plurality of "guest" or alias telephone numbers (which are used exclusively for this service). These numbers are recognized by PSTN 46 to route calls to PBX 30. PBX 30 keeps a table of which mobile unit is assigned which guest number. As a result, PBX 30 can route incoming calls through protocol converter 20, and sets up a call to mobile unit 1.

When the user of mobile telephone 1 turns the telephone off (for example, when he or she arrives at the destination) the mobile system will receive an "off" message at protocol converter 20, which then sends a message via signaling link 60, through signaling network 54 to universal telephone number service 52, which changes the database from the telephone number of mobile unit 1 to a default number. This default number may be the telephone number of telephone 48, a voice mail service such as 62 (as is well known in the art, and will thus not be described further), or some other pre-programmed number. Alternatively, the user could enter a code (such as * or #6) which causes the universal telephone system to search a database and set the reach number to the database entry (telephone number) corresponding to the code. In this manner, the user of a universal telephone service can transfer from a primary number to a mobile unit and the universal telephone service will reach that mobile unit without having to go through the time and effort necessary to register. Thus, for use on short trips, the majority of use for such mobile units, this system provides a great advantage in time and usage over the prior art.

Figure 2:
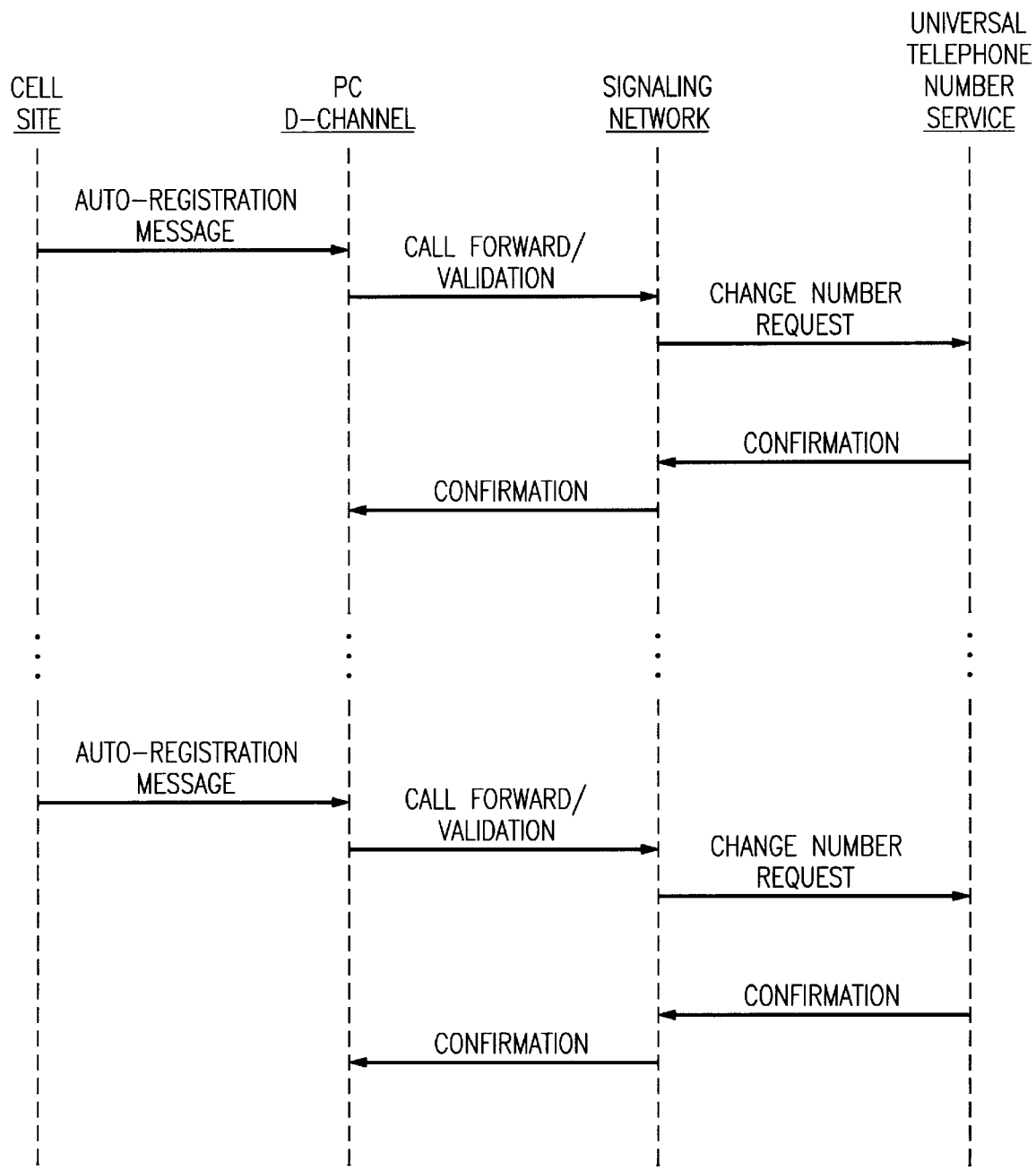
FIG. 2 is a message diagram illustrating the steps of establishing a change request.

Turning now to FIG. 2, FIG. 2 illustrates the messages and the actions performed in setting up a change request for a universal telephone number service due to activation of a wireless unit. A first message is sent from the cell site to the protocol converter (PC) comprising an auto registration message. This message includes the directory number of the mobile unit and the equipment identification number (EIN), which occurs whenever a mobile unit is turned on. The auto registration request message is passed from cell site 10 to its associated protocol converter 20. The protocol converter checks whether the mobile is already registered in that cell site and, if not, sends a message to PBX 30 that all calls for that particular directory number should be sent to the cell site.

Additionally, protocol counter 20 (or, alternatively PBX 30) on the separate PRI D-channel 60 sends a call forward validation message through the signaling network 54. This message may comprise a Q.931 message, as generally used in call forwarding in ISDN protocol. The signaling network forwards the message to the universal telephone number service 52, which then performs a series of verifications and checks, as will be described further below, in connection with FIG. 3. If all numbers are valid, the universal telephone number service records the selected guest number as the currently active number for that particular subscriber and sends a confirmation message back to the signaling network. The signaling network forwards the confirmation message back via D-channel 60 to protocol converter 20.

Eventually, the user turns the mobile unit off, as he or she would, for example, when a destination is reached. As part of the power-down function of a mobile unit, a message is sent from the mobile unit to the cell site indicating that it is being turned off. The cell site forwards this message to the protocol converter. Protocol converter, recognizing that mobile unit has special status, sends a call forward validation message though signaling network to the universal telephone number service. Universal telephone number service recognizes this message as a change request (since the current reach number is no longer valid) and performs some action, as will be described below in connection with FIG. 4. Universal telephone service 52 then sends a confirmation message via signaling network 54 back to protocol converter 20, which then removes the mobile unit from its active list.

Figure 3:
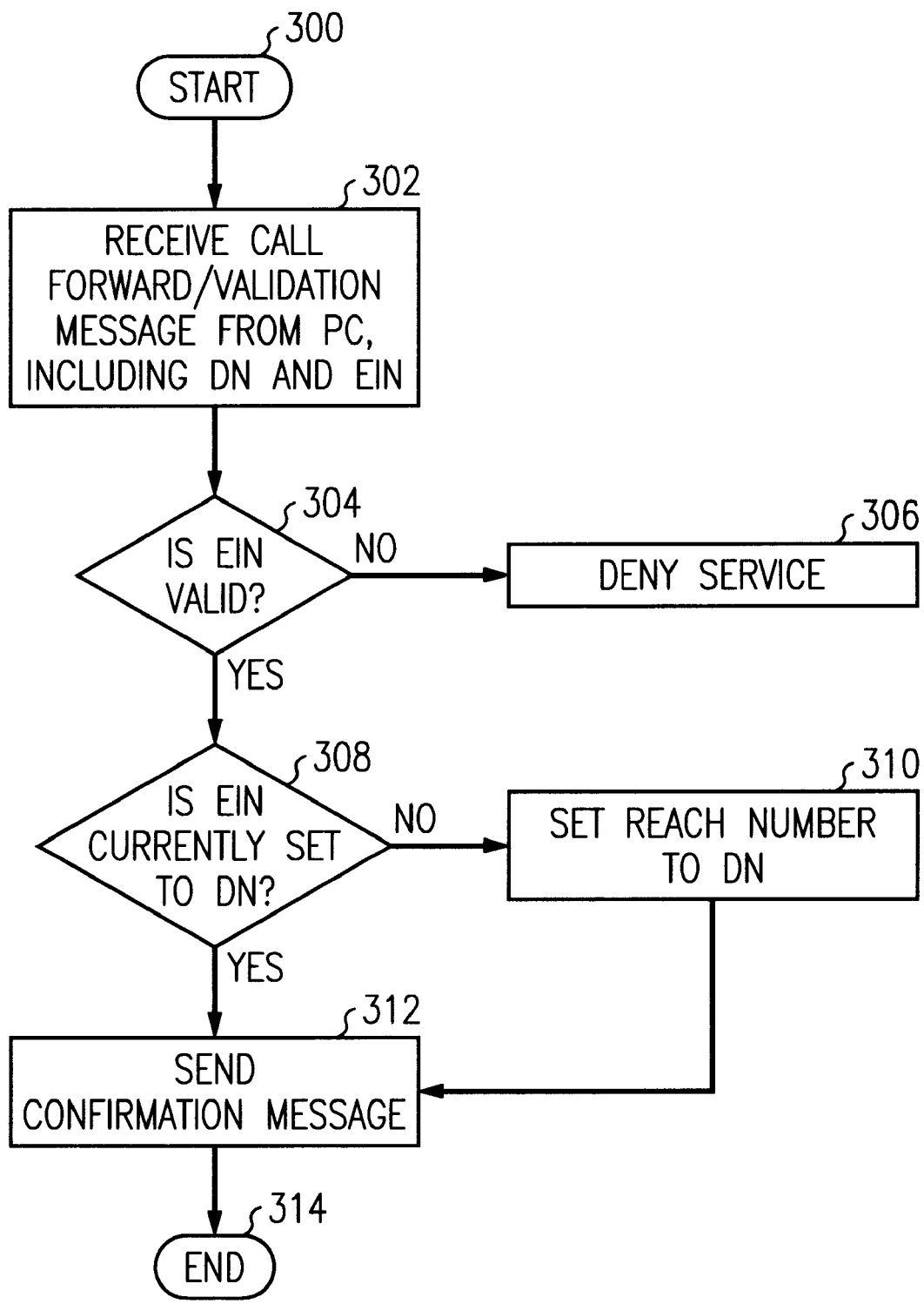
FIG. 3 is a flow chart of actions performed at a universal telephone number service.

Turning now to FIG. 3, actions performed at the universal telephone number service for this system is now described. Action begins in circle 300 and proceeds to action box 302, where a call forward validation message is received from the protocol converter, including the guest number, the DN of the mobile unit and the equipment identification number (EIN) of the mobile unit. In decision diamond 304, a determination is made if the EIN is valid. If the EIN is not valid, service is denied in action box 306.

If, in decision diamond 304, the EIN is valid, then processing proceeds to decision diamond 308, where a determination is made whether the current telephone number is already set to the number received in the message. This may occur, for example, if the user dialed in from a home or a business phone, and manually set the reach number to the number of the mobile phone. If the reach number is currently set to the number of the mobile unit, then nothing is done at this time.

If the reach number is not the same as the directory number of the mobile unit, then the reach number is set to the "guest" number. At this time, all calls to the universal telephone number of this particular subscriber will be routed through the public switch telephone network through to the mobile unit 1. A confirmation message is sent in box 312, as described above, back through the signaling network, and processing ends in circle 314.

Figure 4:
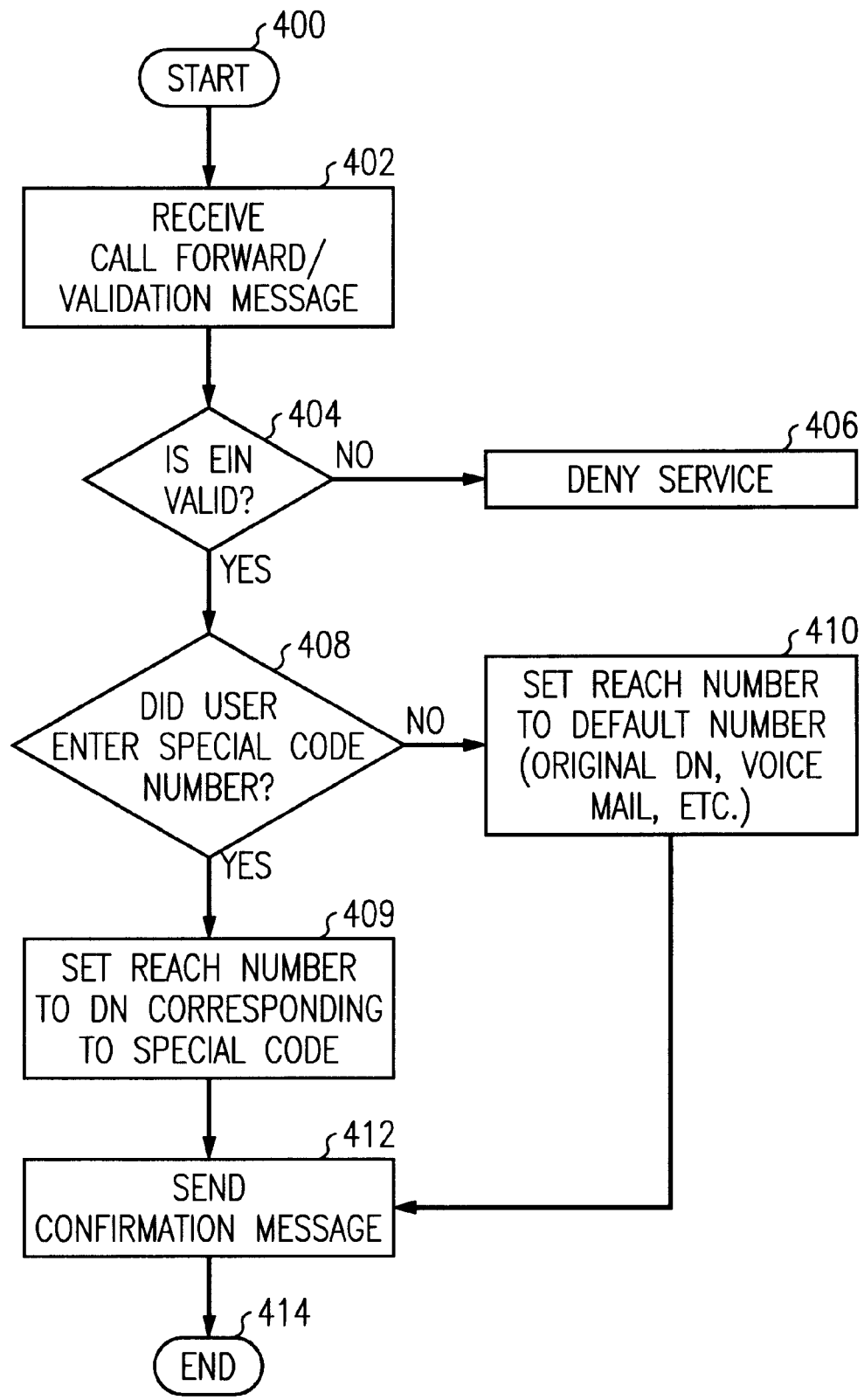
FIG. 4 is a flow chart of actions performed at a universal telephone number service to terminate a call.

Turning now to FIG. 4, processing for automatically terminating a mobile unit as the reach number is shown. Processing starts in circle 400 and moves to action box 402, where the universal telephone service receives a call forward validation message from the protocol converter indicating the enclosed DN and EIN. Processing proceeds to decision diamond 404 where a determination is made if the EIN is valid. If the EIN is not valid, then service is denied in action box 406.

If the EIN is found to be valid in decision diamond 404, then processing proceeds to decision diamond 408 where a determination is made if the user included a special code, as described above. Whenever the unit is powered down, a message will be sent to the universal telephone service. If the user resets the reach number to a special code number, then the default actions should not be taken. In action box 409 the reach number is set to the directory number corresponding to the special code.

If in decision diamond 408 the user did not set a special code number, then in action box 410, the reach number is set to a default number. Such default number could be the user's home or business telephone number, or a voice mail unit. This default number may be changed by the user. After all actions have taken place, a confirmation is sent in action box 412, and processing ends in circle 414.

It is to be understood that the above-described embodiments are merely illustrative principles of the invention, and that many variations may be devised by those skilled in the art without departing from the scope of this invention. It is, therefore, intended that such variations be included within the scope of the claims.

The invention claimed is:

1. A method for use in a telecommunications network, said telecommunications network including a wireless telecommunication system, a signaling network, and a universal telephone number service connected to said signaling network, said universal telephone number service delivering routing telephone numbers responsive to requests for routing information to a subscriber, said method comprising:

responsive to receiving an automatic registration signal from a subscriber's mobile unit, said wireless telecommunication system selecting a directory number for said subscriber's mobile unit, said wireless telecommunication system sending a message via said signaling network to said universal telephone number service, said message including a telephone number for said subscriber's mobile unit;

responsive to receiving said message, said universal telephone number service automatically registering said telephone number for said subscriber's mobile unit and changing call routing for said subscriber from a first telephone number corresponding to a first telephone, to the telephone number of said subscriber's mobile unit, so that, when a request for call direction arrives at said universal telephone number service, said universal telephone number service delivers the telephone number of said subscriber's mobile unit for use in routing a call through said telecommunications network to said subscriber's mobile unit; and responsive to receiving a change request from the subscriber's mobile unit, said universal telephone number service changing call routing from the telephone number of said subscriber's mobile unit to a second telephone number corresponding to a second telephone, so that, when a request for call direction arrives at said universal telephone number service, said universal telephone number service delivers the second telephone number for use in routing the call through said telecommunications network to said second telephone.

2. A method according to claim 1 wherein said automatic registration signal further includes an equipment identification number, said method further including the step of verifying said equipment identification number before automatically registering said selected telephone number of said subscriber's mobile unit.

3. A method according to claim 1 wherein said signaling network comprises an integrated services digital network (ISDN), wherein said step of sending said message comprises sending an ISDN call control message.

4. A method according to claim 1 wherein said wireless telecommunications system includes a protocol converter, wherein said protocol converter receives said message, said step of sending said message on said signaling network comprises said protocol converter sending said message to said universal telephone number service.

5. A method according to claim 4 further including the step of said protocol converter determining that said subscriber subscribes to said universal telephone number service.

6. The method according to claim 1, wherein the second telephone is connected to a landline.

7. The method according to claim 1, wherein the second telephone is connected to a voice mail.

8. The method according to claim 1, wherein the second telephone number is a default number.

9. The method according to claim 1, wherein the step of receiving the change request includes receiving a code sent by said subscriber corresponding to the second telephone number.

10. The method according to claim 1, wherein the automatic registration signal is received when the subscriber turns the mobile unit on and the change request is received when the subscriber turns the mobile unit off.

11. The method according to claim 1, wherein the telephone number of the subscriber's mobile unit is identical to a universal telephone number of the subscriber maintained by the universal telephone number service.

12. A method for use in a telecommunications network including a wireless telecommunication system and a number service, said method comprising:

responsive to receiving an automatic registration signal from a subscriber's mobile unit, said wireless telecommunication system selecting a directory number for said subscriber's mobile unit, said wireless telecommunication system sending a message to said number service, said message including a number for said subscriber's mobile unit; and responsive to receiving said message, said number service changing call routing for said subscriber from a first number corresponding to a first communication unit to the number of said subscriber's mobile unit, so that incoming calls for said subscriber are routed through said telecommunications network to said subscriber's mobile unit.

13. The method of claim 12, further comprising the steps of:

receiving an automatic change request from said subscriber's mobile unit;

responsive to receiving said automatic change request, said wireless telecommunication system sending a message to said number service; and responsive to receiving said message, said number service changing call routing for said subscriber from said number of said subscriber's mobile unit to said first number, so that incoming telephone calls for said subscriber are routed through said telecommunications network to said first communication unit.

14. The method of claim 12, further comprising the steps of:

receiving an automatic change request from said subscriber's mobile unit;

responsive to receiving said automatic change request, said wireless telecommunication system sending a message to said number service; and responsive to receiving said message, said number service changing call routing for said subscriber from said number of said subscriber's mobile unit to a second number corresponding to a second communication unit, so that incoming calls for said subscriber are routed through said telecommunications network to said second communication unit.

\* \* \* \* \*